(12) United States Patent
Huang

(10) Patent No.: US 9,554,451 B2
(45) Date of Patent: Jan. 24, 2017

(54) WALLMOUNT DUAL BEAM SENSING DEVICE

(71) Applicant: IR-TEC INTERNATIONAL LTD., Taoyuan (TW)

(72) Inventor: Wen-I Huang, Taoyuan (TW)

(73) Assignee: IR-TEC International Ltd., Taoyuan (TW)

( * ) Notice: Subject to any disclaimer, the term of this patent is extended or adjusted under 35 U.S.C. 154(b) by 0 days.

(21) Appl. No.: 14/825,311

(22) Filed: Aug. 13, 2015

(65) Prior Publication Data

US 2016/0174349 A1    Jun. 16, 2016

(30) Foreign Application Priority Data

Dec. 12, 2014   (TW) .............................. 103222041 U

(51) Int. Cl.
*H05B 41/36* (2006.01)
*H05B 37/02* (2006.01)

(52) U.S. Cl.
CPC .......... *H05B 41/36* (2013.01); *H05B 37/0218* (2013.01); *H05B 37/0227* (2013.01)

(58) Field of Classification Search
CPC . H05B 41/36; H05B 37/0218; H05B 37/0227; F21V 23/008
USPC ........................................................ 315/130
See application file for complete search history.

(56) References Cited

U.S. PATENT DOCUMENTS

| | | | | |
|---|---|---|---|---|
| 6,850,159 B1* | 2/2005 | Mudge | ............... | H05B 37/0227 340/541 |
| 7,688,005 B2* | 3/2010 | Reid | ...................... | H05B 37/04 315/291 |
| 8,669,720 B2* | 3/2014 | Goyal | ................ | H05B 33/0854 315/291 |
| 9,084,310 B2* | 7/2015 | Bedell | ................ | H05B 37/0227 |
| 2003/0227440 A1* | 12/2003 | Fager | .................... | G01S 5/0247 345/156 |
| 2010/0109934 A1* | 5/2010 | Drake | ................. | F21V 23/0442 342/28 |
| 2013/0300290 A1* | 11/2013 | Holland | ............. | H05B 37/0218 315/113 |
| 2014/0265880 A1* | 9/2014 | Taipale | .............. | H05B 37/0263 315/158 |
| 2016/0139576 A1* | 5/2016 | Aiken | .................... | G05B 15/02 700/276 |

* cited by examiner

*Primary Examiner* — Dylan White
(74) *Attorney, Agent, or Firm* — Rosenberg, Klein & Lee

(57) ABSTRACT

A wallmount dual beam sensing device has a microcontroller unit (MCU) mounted inside a housing and electrically connected to an ambient light detector, an infrared detector and a microwave sensing module. The MCU determines if the infrared detector and the microwave sensing module are activated according to detected luminance by the ambient light detector and outputs a control signal when the infrared detector and the microwave sensing module are activated and any one of the infrared detector and the microwave sensing module detects the presence of people in a monitored environment. Accordingly, the infrared detector and the microwave sensing module statically and dynamically sense the monitored environment in a 3D manner at the same time, thereby ensuring a stable and reliable sensing result.

16 Claims, 16 Drawing Sheets

WALLMOUNT DUAL BEAM SENSING DEVICE

BACKGROUND OF THE INVENTION

1. Field of the Invention

The present invention relates to a sensing device and, more particularly, to a wallmount dual beam sensing device with a passive infrared detector and a microwave detection module.

2. Description of the Related Art

Owing to environmental awareness about energy conservation and carbon reduction, automatically controlling lighting and/or air conditioning within a specific region of a public space or a home space according to an instant environmental condition becomes an important development trend of intelligent power management. To most spaces, lighting and air conditioning are undoubtedly atop a list of energy consumption, making them easy sources of energy waste in the spaces, especially in public spaces because most people in public spaces will not turn off the unnecessary lighting and/or air conditioning when leaving. Therefore, enormous energy waste arises. To cope with the energy waste, sensing devices with infrared detectors are developed to assist energy management in public spaces, such that lighting and air conditioning can be automatically turned on or off according to environmental conditions and setting conditions for the purpose of energy conservation and carbon reduction.

However, conventional infrared detectors tend to be mounted on ceilings and appearing outside, rendering them not only aesthetically unpleasant but feasible for two-dimensional detection only. The two-dimensional detection functionality can detect the presence of people in a sensed space while failing to determine the distance between a moving object and a sensing device. Other shortcomings of infrared detection include unreliable detection result and failure in wall penetration. When infrared detection is applied to a place with multiple partitions, such as a toilet, people inside the partitions oftentimes fail to be detected and errors in detection are caused.

In contrast to infrared sensing device, ultrasonic sensing devices need to have holes formed therethrough and are thus aesthetically unpleasant. Malfunction of the ultrasonic devices can also arise from foreign matter stuffed in the holes.

SUMMARY OF THE INVENTION

An objective of the present invention is to provide a wallmount dual beam sensing device capable of statically and dynamically sensing a monitored environment in a 3D manner at the same time and securing a high sensing reliability.

To achieve the foregoing objective, the wallmount dual beam sensing device has a housing, a control module, an infrared detector and a microwave sensing module.

The housing has a detection cover mounted on a front surface of the housing.

The control module is mounted inside the housing and has a microcontroller unit (MCU). The MCU has an ambient light terminal, an infrared terminal and a microwave terminal.

The infrared detector is mounted inside the housing, is covered by the detection cover, and is electrically connected to the infrared terminal of the MCU.

The microwave sensing module is mounted inside the housing, is covered by the detection cover, and is electrically connected to the microwave terminal of the MCU.

Preferably, the wallmount dual beam sensing device further includes an ambient light detector mounted inside the housing, covered by the detection cover, and electrically connected to the ambient light terminal of the MCU to detect luminance of a monitored environment.

The infrared detector and the ambient light detector are constantly operating after powered on. When the detected luminance of the monitored environment is lower than a luminance threshold, the MCU determines if the infrared detector detects human presence, when the infrared detector detects human presence, the MCU activates the microwave sensing module to determine if the microwave sensing module detects human presence, and when the microwave sensing module detects human presence, the MCU sends out a control signal adapted to turn on at least one electric appliance. When the at least one electric appliance is turned on and the detected luminance is equal to or higher than the luminance threshold, the MCU further determines if the human presence is detected by the infrared detector, when the infrared detector detects no human presence, the MCU then outputs a control signal to turn off the at least one electric appliance.

Preferably, the housing further has multiple slots, a fixing frame and a protection cover. The fixing frame takes a form of a thin metal frame securely mounted on the front surface of the housing with the detection cover and the sliding lid exposed. The protection cover is stacked on the fixing frame and has multiple inserts respectively engaging the slots.

The present invention is advantageous in inclusion of a passive infrared detector and a microwave sensing module capable of statically and dynamically sensing the monitored environment in a 3D manner at the same time. Additionally, when the present invention is mounted in a wall, there is no hole formed on the sensing device and exposed outside the wall, rendering high sensing reliability.

Other objectives, advantages and novel features of the invention will become more apparent from the following detailed description when taken in conjunction with the accompanying drawings.

DETAILED DESCRIPTION OF THE INVENTION

Figure 1:
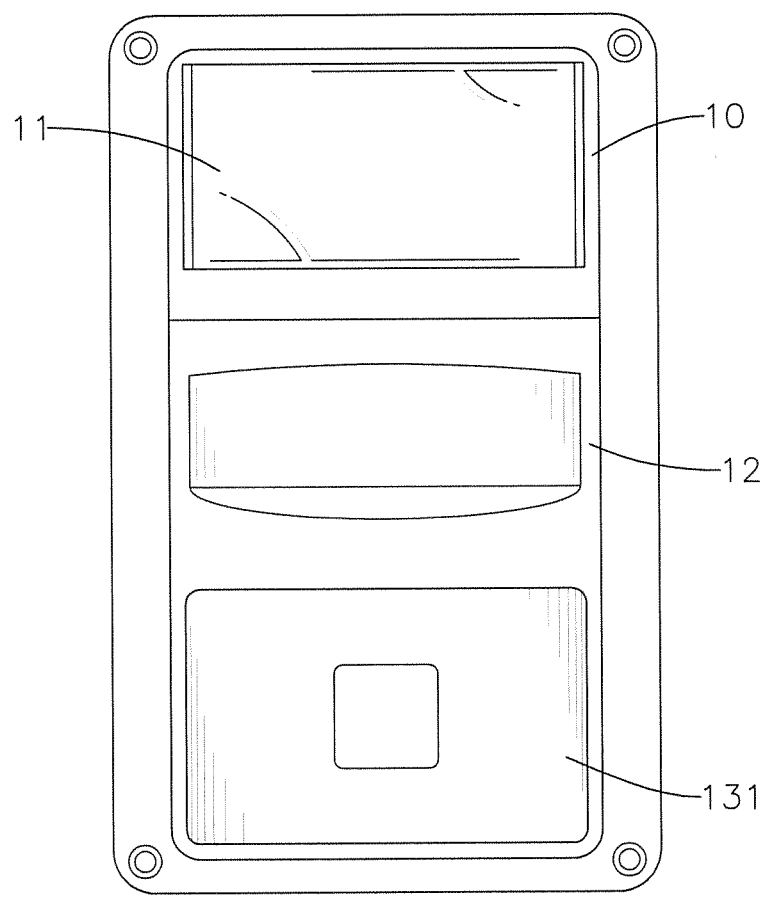
FIG. 1 is a front view of a first embodiment of a wallmount dual beam sensing device in accordance with the present invention.

With reference to FIGS. 1, 2, 3 and 6, a first embodiment of a wallmount dual beam sensing device in accordance with the present invention includes a housing 10, a control module, an ambient light detector 30, an infrared detector 40 and a microwave sensing module 50.

The housing 10 has a detection cover 11 and a sliding lid 12. The detection cover 11 is mounted on a front surface of the housing 10. The sliding lid 12 is slidably mounted on a portion of the front surface of the housing 10 other than the detection cover 11. In the present embodiment, the detection cover 11 is made from a material that is penetrable to infrared ray and visible light, and covers the ambient light detector 30 and the infrared detector 40. The sliding lid 12 can be freely slid up and down on the housing 10 and has a first test switch 131. The first test switch 131 is mounted on the sliding lid 12 and tests if the control module is normally outputting a control signal. In the present embodiment, the first test switch 131 serves to toggle the control signal. For example, pushing the first test switch once when a load indicator is lit will turn off the load indicator, and pushing the first test switch once again will turn on the load indicator.

Figure 2:
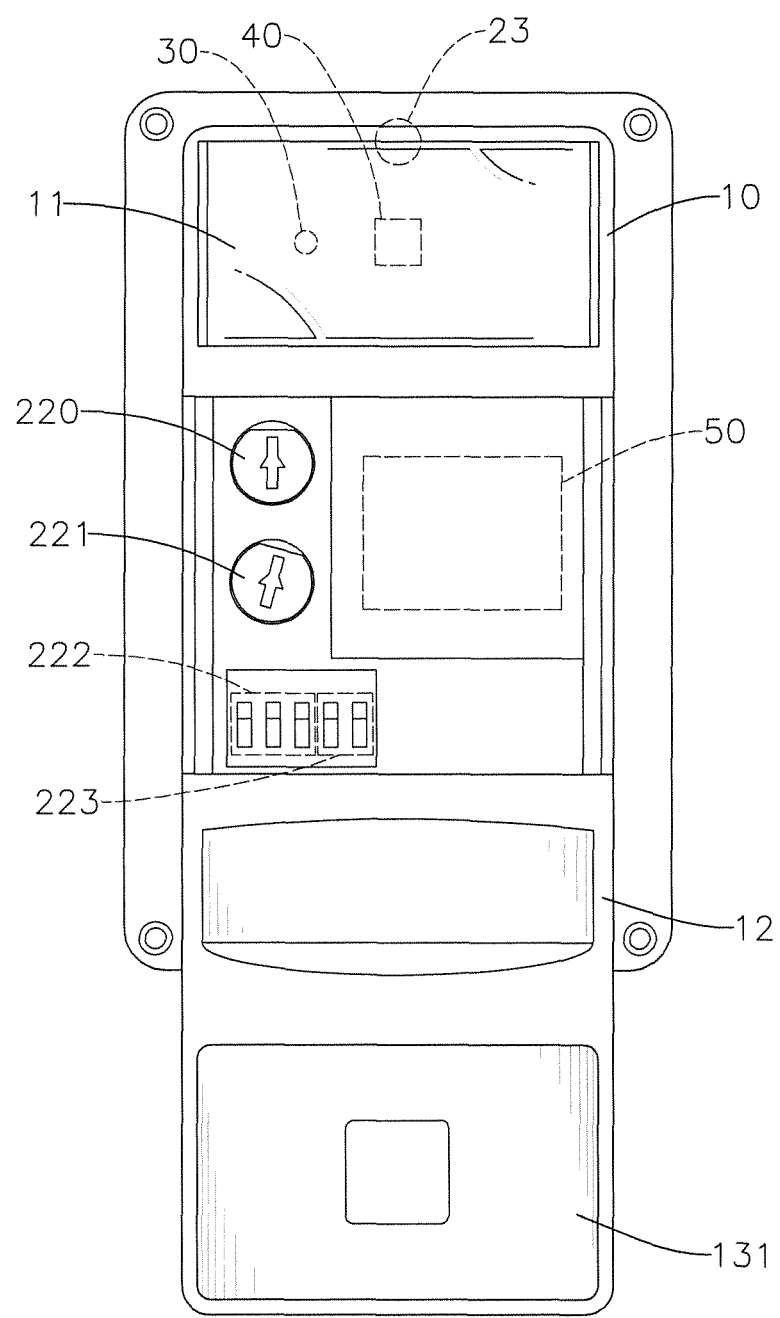
FIG. 2 is a front view of the wallmount dual beam sensing device in FIG. 1 with a sliding lid slid to an open position.
Figure 4A:
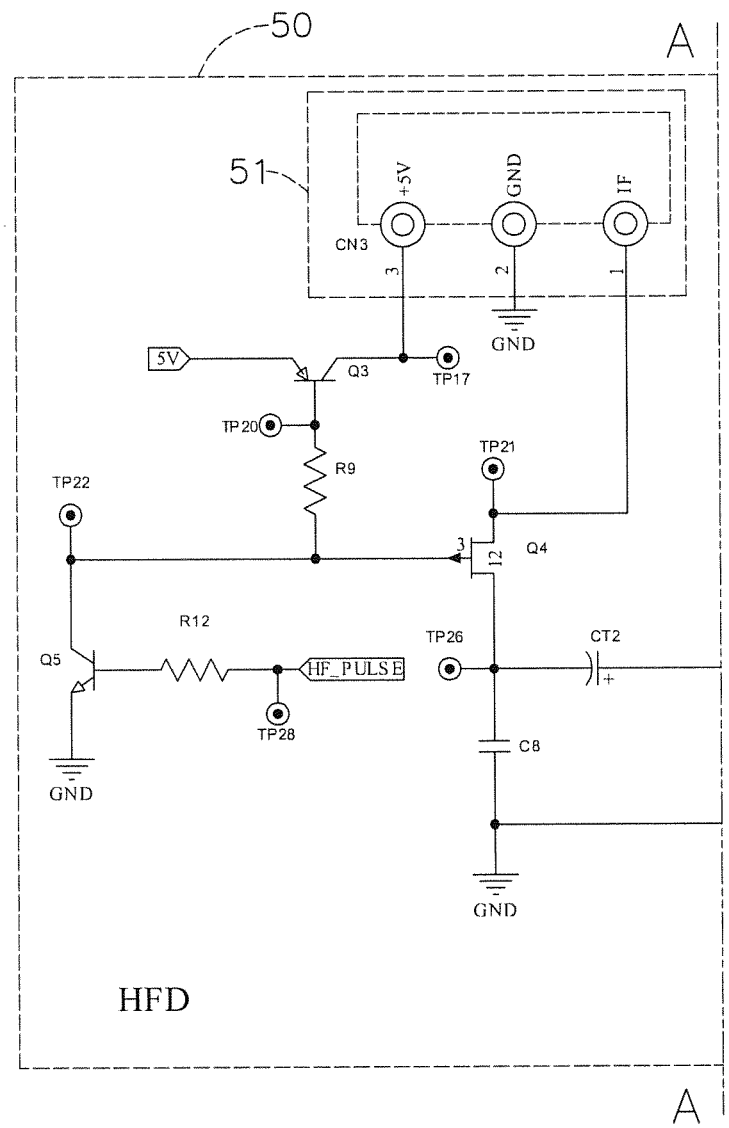
FIGS. 4A to 4I are circuit diagrams associated with the wallmount dual beam sensing device in FIG. 1.
Figure 4B:
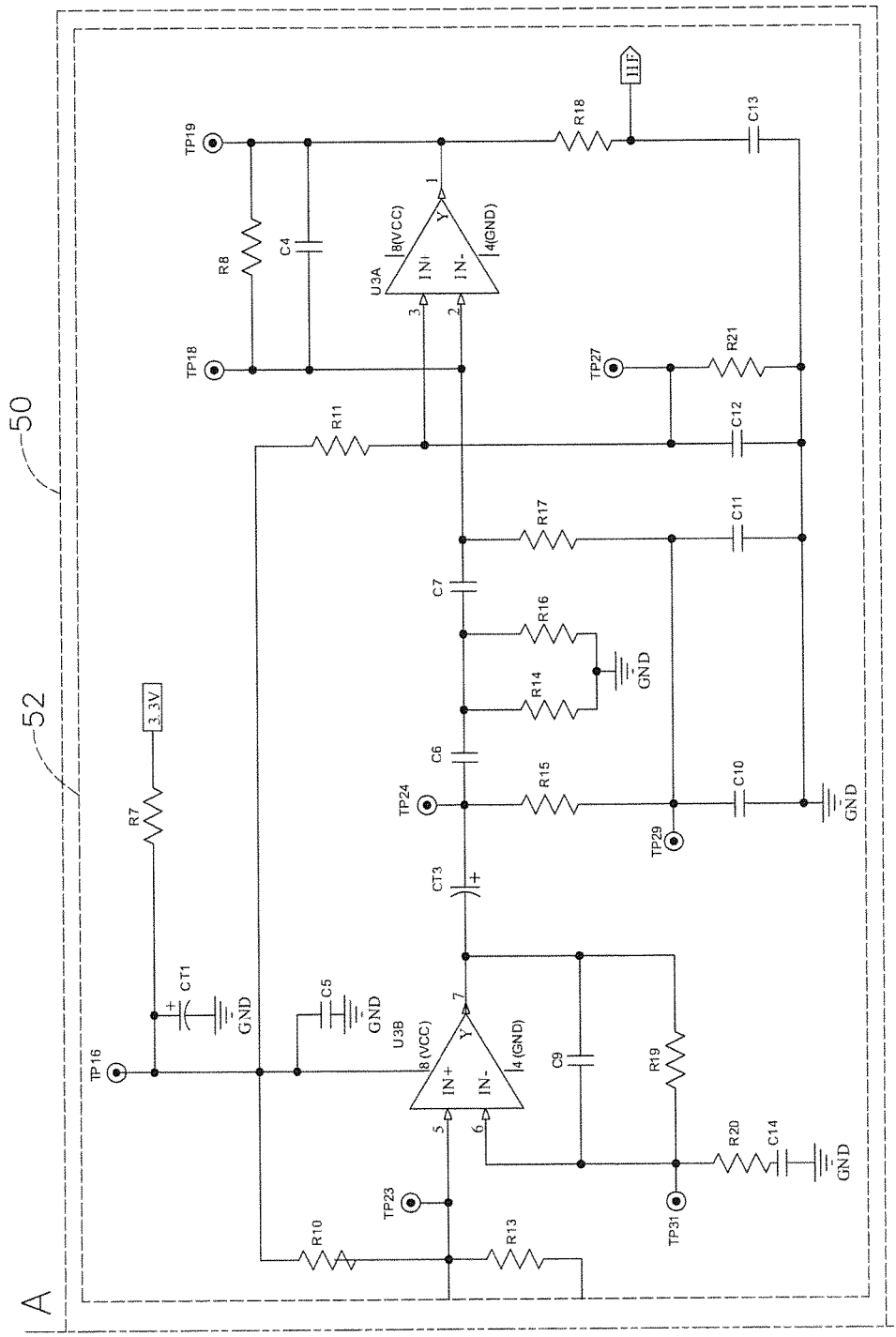
Figure 4C:
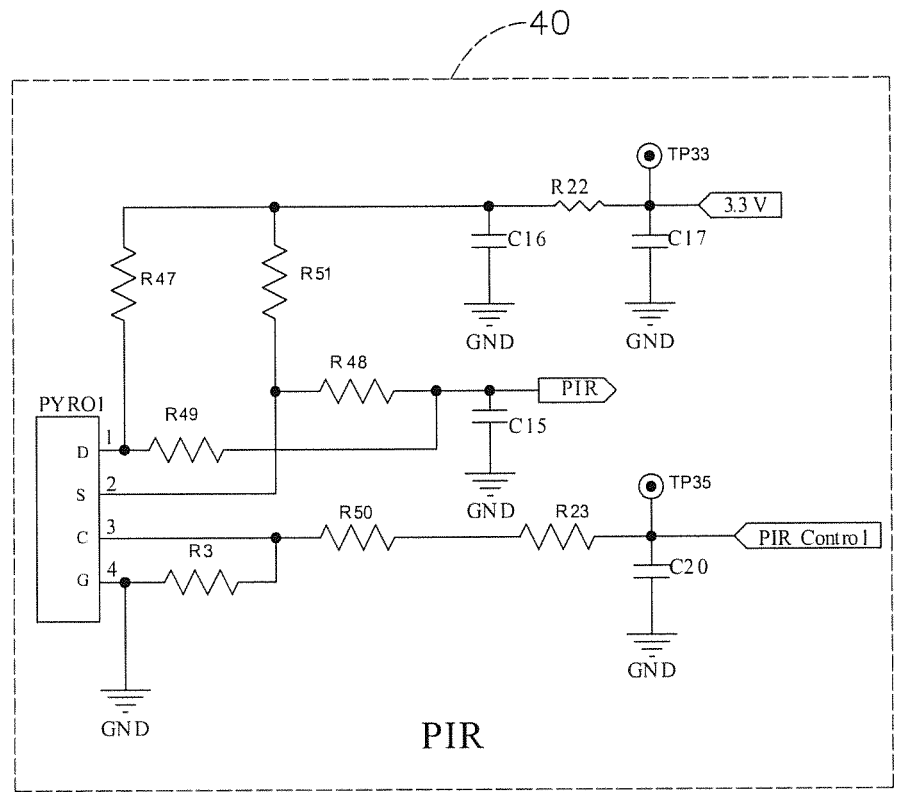
Figure 4C:
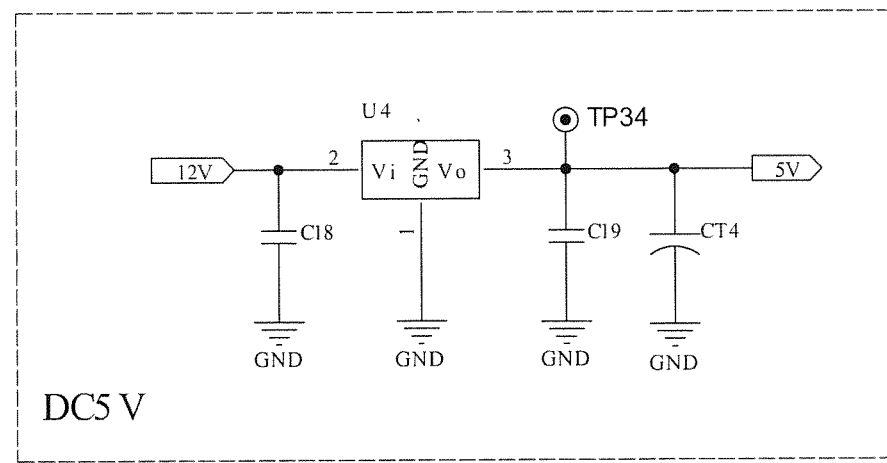
Figure 4D:
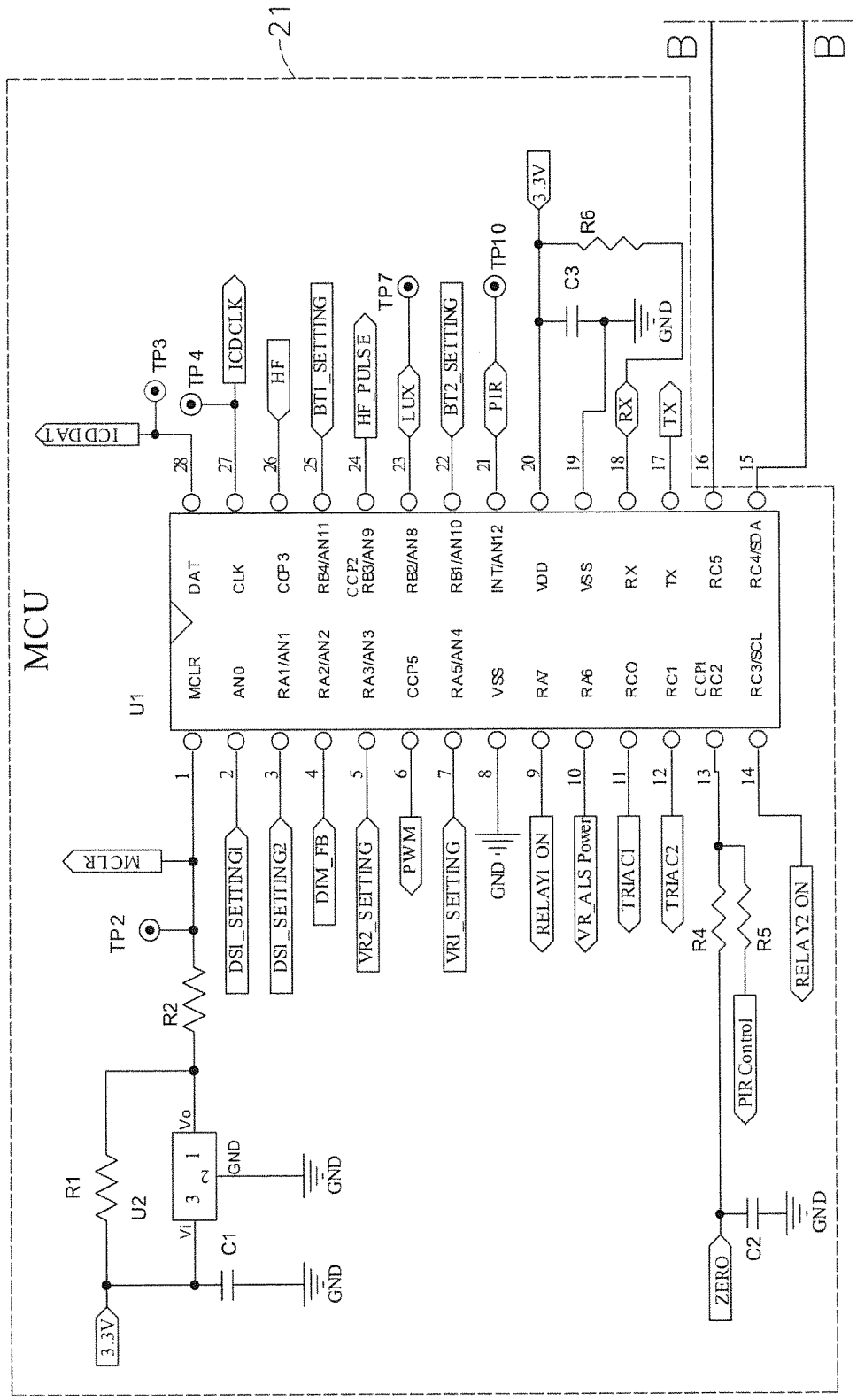
Figure 4E:
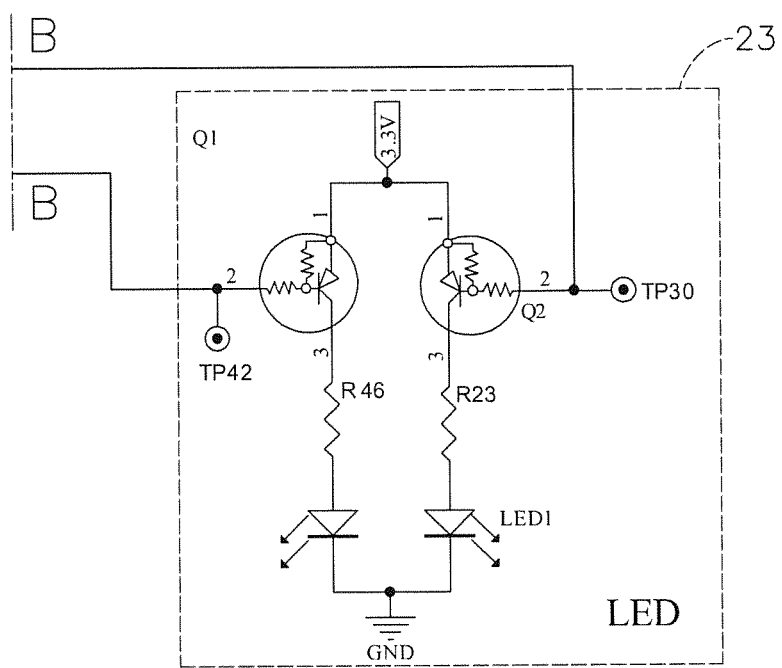
Figure 4F:
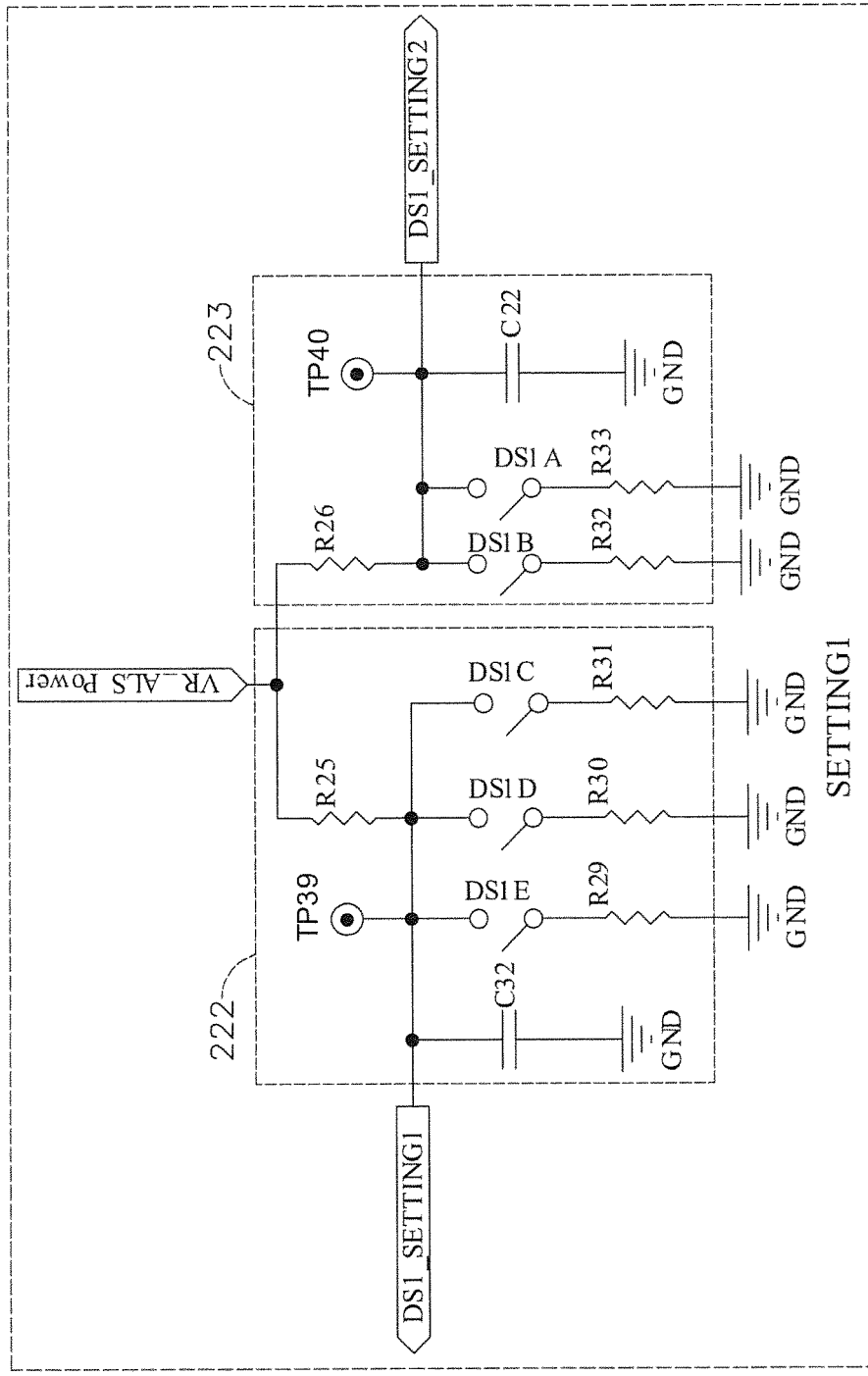
Figure 4G:
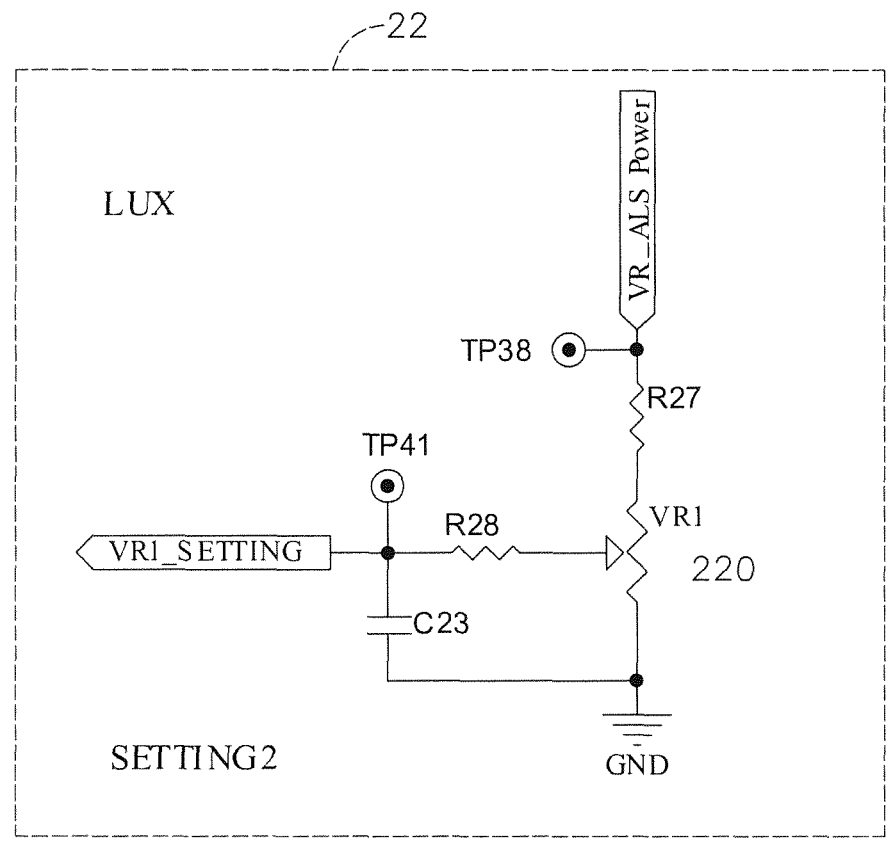
Figure 4H:
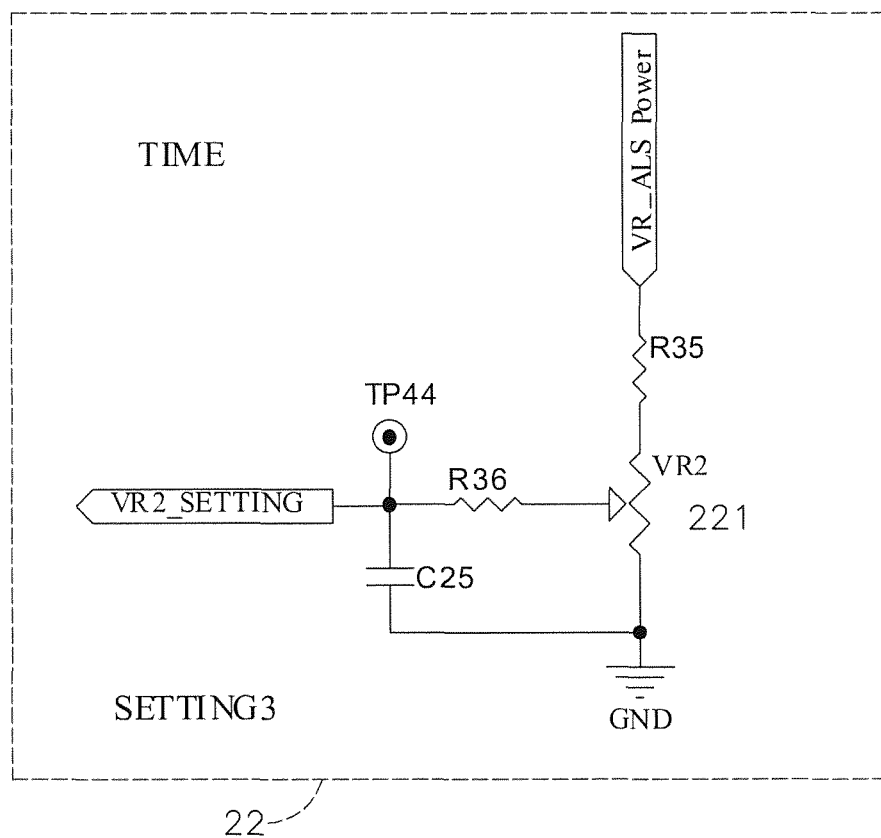
Figure 4I:
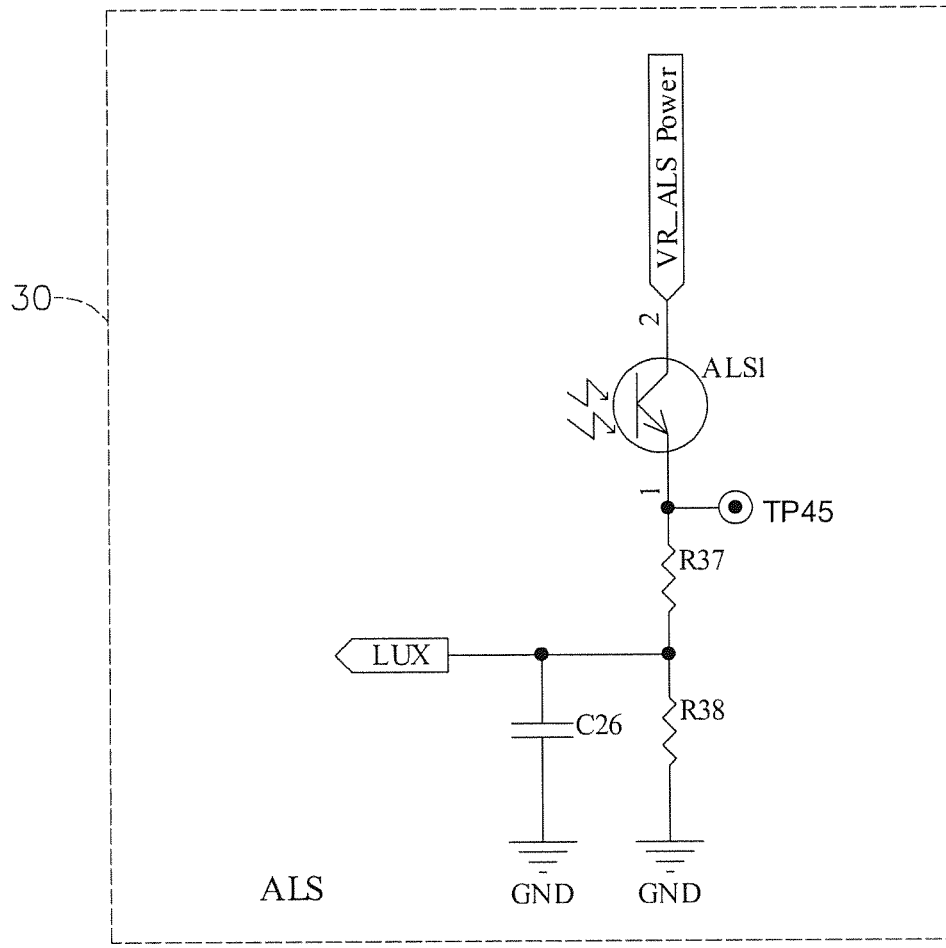

The control module is mounted inside the housing 10 and has a microcontroller unit (MCU) 21, multiple configuration units 22 and an indicator 23. The MCU 21 has an ambient light terminal, an infrared terminal and a microwave terminal respectively and electrically connected to the ambient light detector 30, the infrared detector 40 and the microwave sensing module 50. The MCU 21 is further electrically connected to the first test switch 131, the multiple configuration units 22 and the indicator 23. With reference to FIGS. 2, 4D and 4E, the indicator 23 is formed of light-emitting diodes (LEDs) and is mounted inside the detection cover 11 to flash to indicate operation modes of the infrared detector 40 and the microwave sensing module 50.

The ambient light detector 30 is mounted inside the housing 10 and covered by the detection cover 11, and serves to constantly detect luminance (Lux) of sunlight or a light source in a monitored environment after the wallmount dual beam sensing device is powered on. When the detected luminance in the monitored environment is lower than a luminance threshold, the ambient light detector 30 generates a dark signal and outputs the dark signal to the MCU 21. Otherwise, the ambient light detector 30 generates a bright signal and outputs the bright signal to the MCU 21.

With reference to FIGS. 4F, 4G, 4H and 4I, the multiple configuration units 22 include a first variable resistor 220, a second variable resistor 221, and two switching units 222, 223. In the present embodiment, the two switching units 222, 223 are dip switches.

The first variable resistor 220 is electrically connected to a first mains resistor R27 and a first voltage setting port of the MCU 21. A resistance value of the first variable resistor 220 is adjusted according to the voltage divider rule to alter a voltage outputted to the first voltage setting port. The first voltage setting port serves to set a sensitivity of the ambient light detector 30 in response to the detected luminance of the ambient environment.

The second variable resistor 221 is electrically connected to a second mains resistor R35 and a second voltage setting port of the MCU 21. A resistance value of the second variable resistor 221 is adjusted according to the voltage divider rule to alter a voltage value outputted to the second voltage setting port. The second voltage setting port serves to set a delay time for delaying a control signal outputted from the MCU 21 to turn off at least one electric appliance.

One of the two switching units 222 has a third mains resistor R25, multiple switches and multiple resistors R29~R31. Each resistor R29~R31 is connected in series to the third mains resistor R25 through one of the switches, and the resistors R29~R31 are connected in parallel to each other when the switches are closed. A common series-connected node between the third mains resistor R25 and each switch is connected to the MCU 21. Each switch is selectively set to be open or closed to adjust a series connection relationship between a corresponding resistor R29~R31 and the third mains resistor R25 and a parallel connection relationship among the multiple resistors R29~R31, such that the MCU 21 varies the voltage value to a third voltage setting port of the MCU21 to adjust a sensitivity of the microwave sensing module 50 and further determines whether to activate the microwave sensing module 50 according to the detected luminance.

The other switching unit 223 has a fourth mains resistor R26, two switches and two resistors R32, R33. Each resistor R32, R33 is connected in series to the fourth mains resistor R26 through one of the switches, and the resistors R32, R33 are connected in parallel to each other when the switches are closed. A common series-connected node between the fourth mains resistor R26 and each switch is connected to the MCU 21. Each switch is selectively set to be open or closed to adjust a series connection relationship between a corresponding resistor R32, R33 and the fourth mains resistor R26 and a parallel connection relationship among the two resistors R32, R33, such that the voltage value to a fourth voltage setting port of the MCU 31 is varied to change to a corresponding operation mode.

With reference to FIGS. 2, 4A, 4B and 4C, the infrared detector 40 is mounted inside the housing 10 and covered by the detection cover 11, and serves to constantly detect infrared rays emitted from people and the presence of people in a blockage-free monitored environment. When detecting human presence, the infrared detector 40 outputs a first human presence signal to the MCU 21. In the present embodiment, the infrared detector 40 is a passive infrared detector.

The microwave sensing module 50 serves to detect the presence of people in a monitored environment with blockage, and has a microwave detector 51 and a filter amplifier 52. The filter amplifier 52 is electrically connected to the microwave detector 51 and a microwave signal terminal of the MCU 21. In the present embodiment, the microwave detector 51 is a high frequency doppler (HFD) radar for determining a distance between a moving object and the sensing device. As microwave pertains to high-frequency signals with good penetrability, it is unnecessary for the microwave sensing module 50 to be covered by the detection cover 11. When detecting human presence, the microwave sensing module 50 outputs a second human presence signal to the MCU 21.

When the wallmount dual beam sensing device is operated, a rear portion of the housing 10 opposite to the detection cover 11 and the sliding lid 12 is mounted inside a wall and connected to a power source. Prior to actual operation, the first test switch 131 is pushed to test if the control signal outputted from the MCU 21 is normal. When the first test switch 131 is pushed, the on/off state of the control signal outputted from the MCU 21 toggles. Speaking of the at least one electric appliance controlled by the control signal, in the case of a fluorescent lamp, the fluorescent lamp can be turned on/off by the control signal to indicate the on/off state of the control signal. After the multiple configuration units 22 are done with setting, the actual operation starts and the ambient light detector 30 first detects luminance in a monitored environment to determine if the detected luminance is lower than the luminance threshold. Let's start with the fluorescent lamp turned off. When the detected luminance of sunlight is equal to or higher than the luminance threshold, the MCU 21 receives the bright signal from the ambient light detector 30 and ignores output from the infrared detector 40. When the detected luminance of sunlight is lower than the luminance threshold, the MCU 21 receives the dark signal from the ambient light detector 30 and further determines if the first human presence signal is received from the infrared detector 40. When receiving the first human presence signal, the MCU 21 activates the microwave sensing module 50 to detect if any person is present in the monitored environment. When receiving the second human presence signal from the microwave sensing module 50, the MCU 21 then outputs a control signal to turn on the fluorescent lamp. After the fluorescent lamp is turned on, the ambient light detector 30 detects luminance emitted from the fluorescent lamp in the monitored environment and determines if the detected luminance of fluorescent lamp is equal to or higher than the luminance threshold. When the detected luminance is equal to or higher than the luminance threshold, the MCU 21 further determines if the first human presence signal is received from the infrared detector 40 and the second human presence signal is received from the microwave sensing module 50. When receiving both the first human presence signal and the second human presence signal, the MCU 21 then outputs a control signal to turn off the fluorescent lamp. As the microwave sensing module 50 is not activated, there is a chance that people behind blockage fail to be detected by the infrared detector 40. However, due to a delay time for the turn-off control signal set by the second voltage setting port, the MCU 21 does not send out the control signal to turn off the fluorescent lamp until the delay time expires, and will disable the turn-off control signal if the MCU 21 receives the dark signal from the ambient light detector 30 and also receives the first human presence signal and the second human presence signal.

Figure 3:
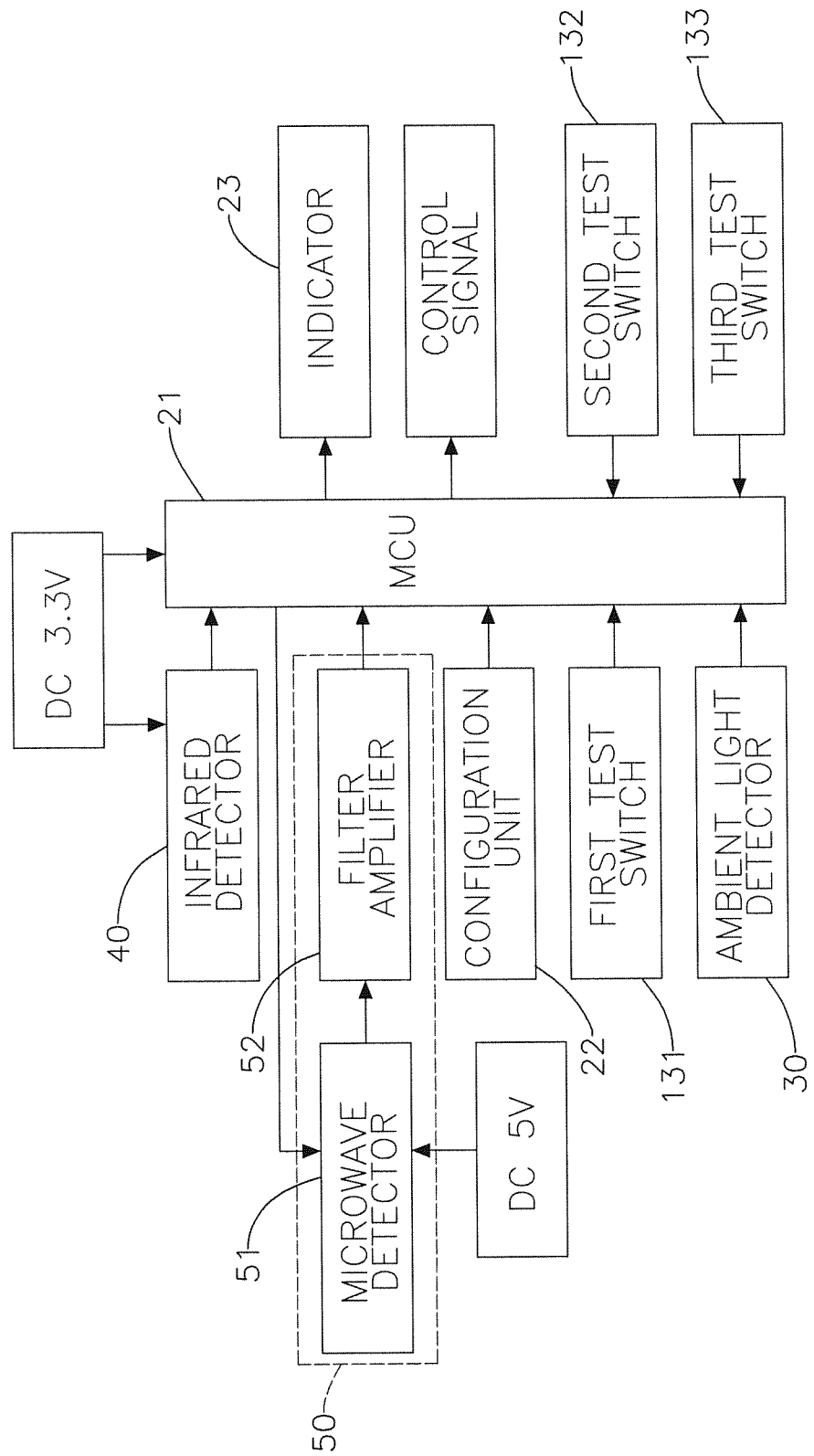
FIG. 3 is a functional block diagram of the wallmount dual beam sensing device in FIG. 1.
Figure 5:
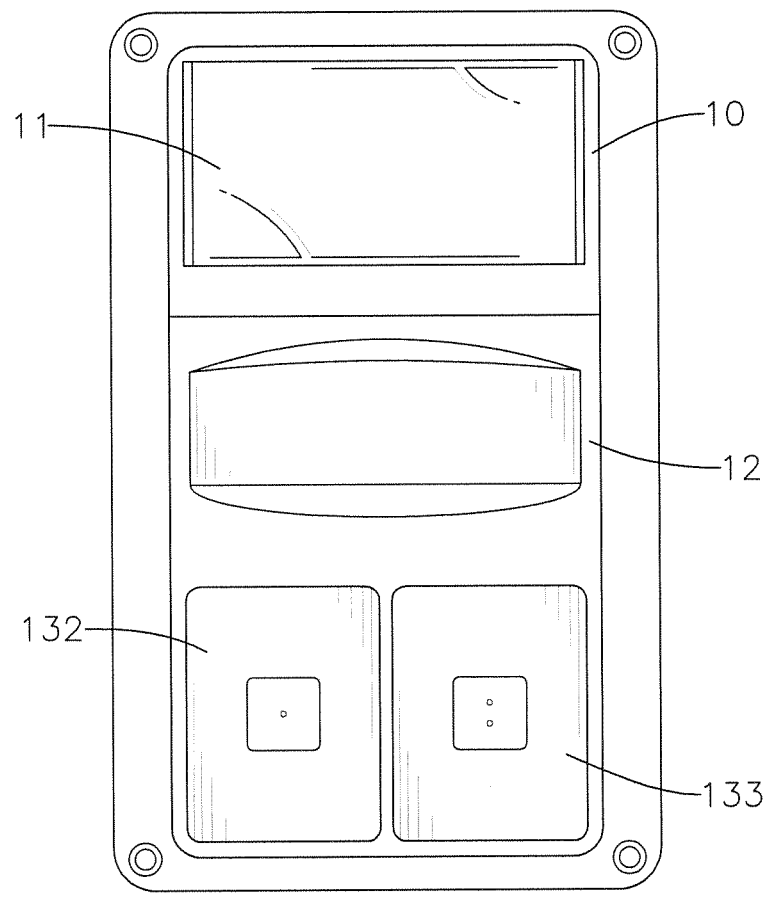
FIG. 5 is a front view of a second embodiment of a wallmount dual beam sensing device in accordance with the present invention.
Figure 6:
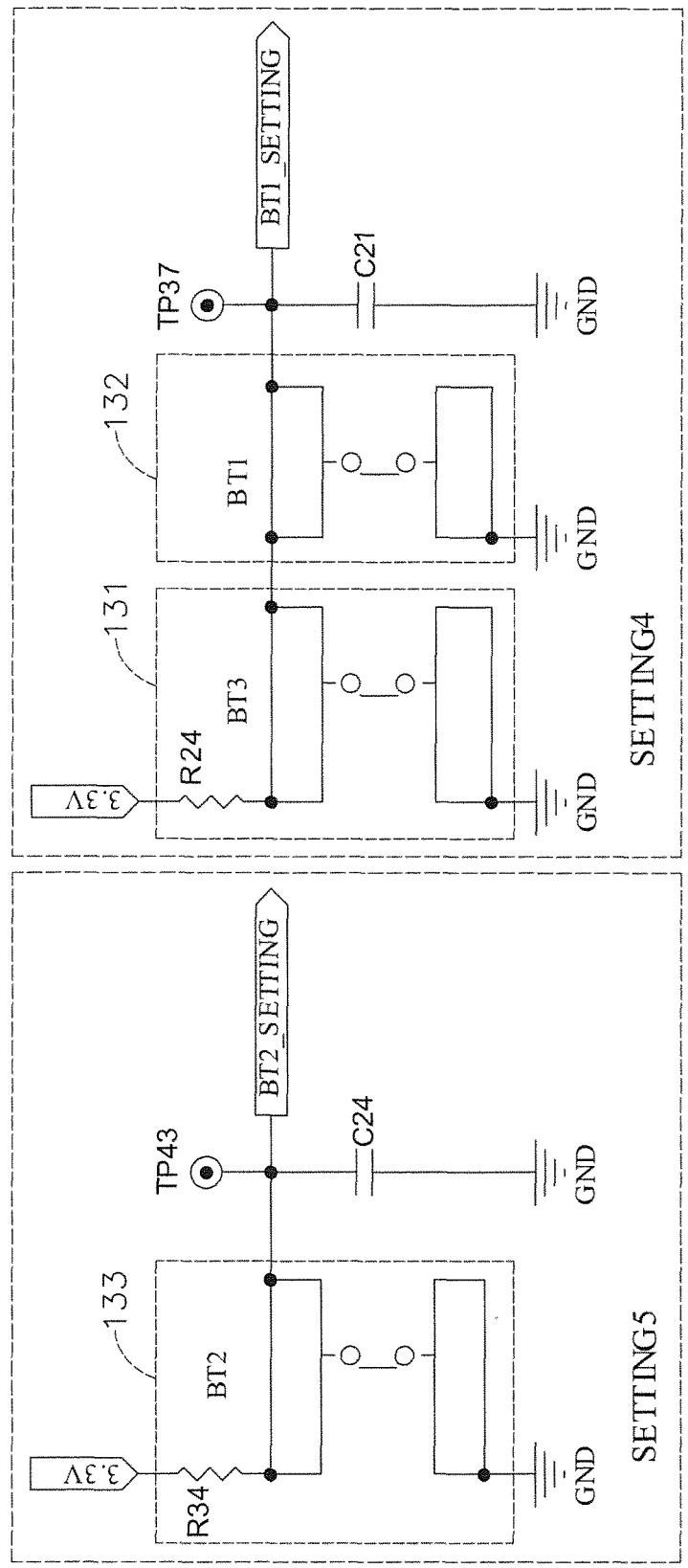
FIG. 6 is a circuit diagram of a test switch of the wallmount dual beam sensing device in FIG. 1 or 5.

With reference to FIGS. 3, 5 and 6, a second embodiment of a wallmount dual beam sensing device in accordance with the present invention differs from the foregoing embodiment in that the sliding lid 12 further has a second test switch 132 and a third test switch 133, and the MCU 21 simultaneously outputs two control signals to turn on two fluorescent lamps. In the present embodiment, the second test switch 132 and the third test switch 133 can be used to test two fluorescent lamps in two different regions partitioned in a monitored environment.

Figure 7:
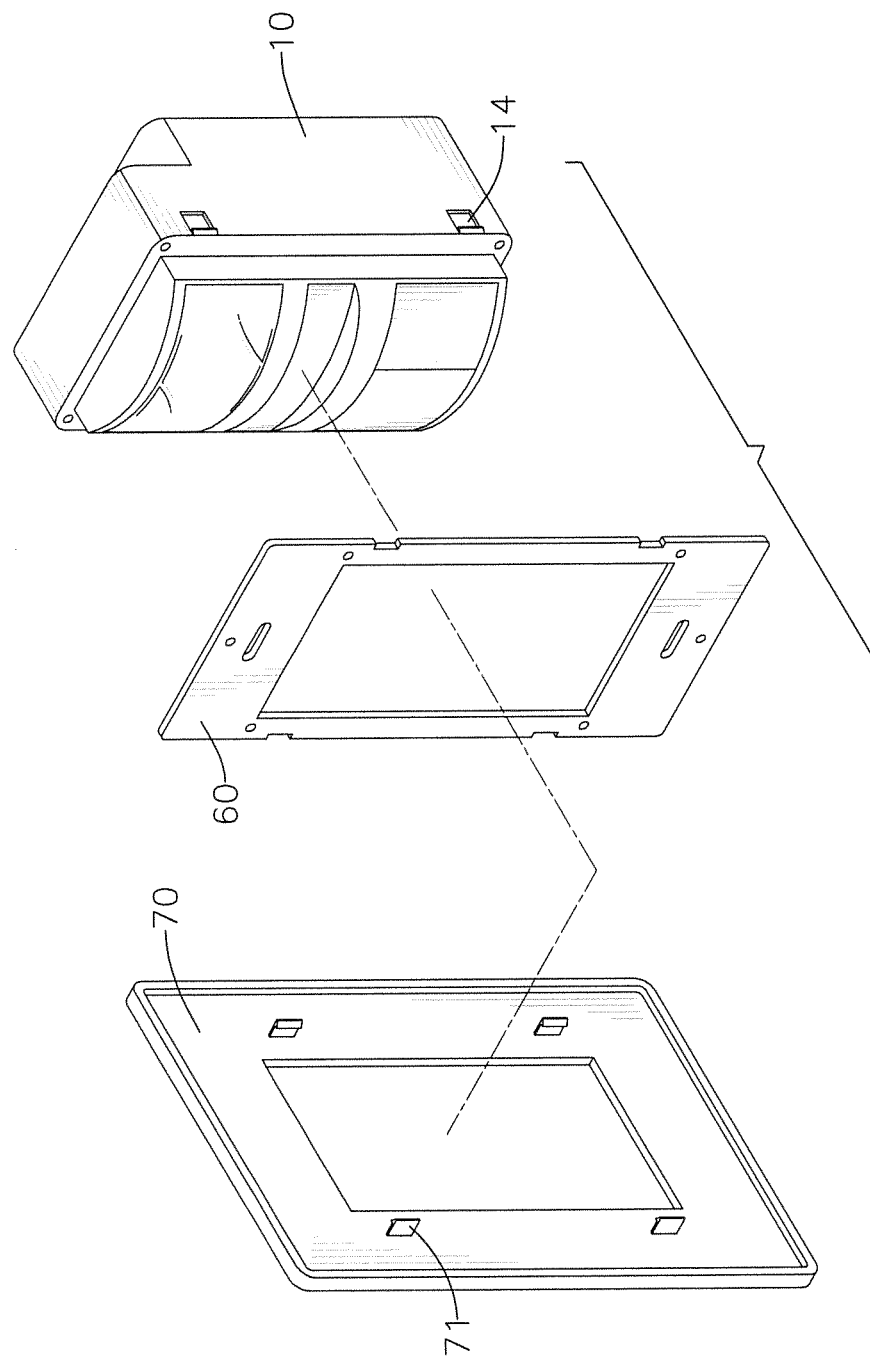
FIG. 7 is a partially exploded operational perspective view of the wallmount dual beam sensing device in FIG. 1 or 5 with a wallmount assembly.
Figure 8:
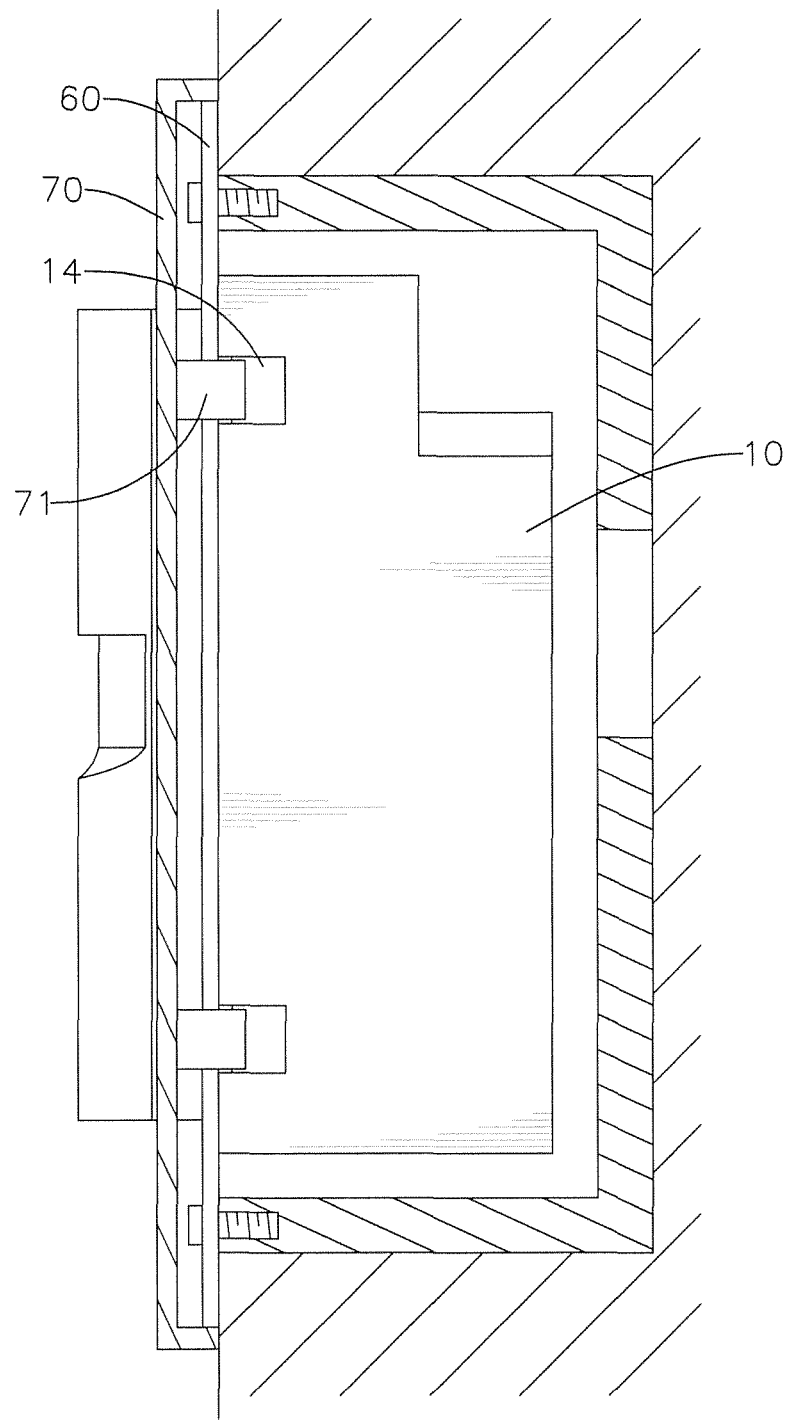
FIG. 8 is a cross-sectional side view of the wallmount dual beam sensing device in FIG. 7 when the wallmount dual beam sensing device is mounted on a wall.

With reference to FIGS. 7 and 8, the housing 10 in the foregoing embodiments may further have multiple slots 14, a fixing frame 60 and a protection cover 70. The fixing frame 60 and the protection cover 70 are mounted on the front surface of the housing 10. The fixing frame 60 may be in the form of a thin metal frame securely mounted on the housing 10 with the detection cover 11 and the sliding lid 12 exposed. The fixing frame 60 allows the housing 10 to be fastened on a wall with a new recess or a recess of an existing switch. After the housing 10 is placed in the recess on the wall, the fixing frame 60 covers the recess and the protection cover 70 is further stacked on the fixing frame 60 with the detection cover 11 and the sliding lid 12 exposed. The protection cover 70 has multiple inserts 71 formed on a surface thereof facing the fixing frame 60 and respectively engaging the slots 14, such that the protection cover 70 is securely fastened on the housing 10 to cover the recess, the fixing frame 60 and the housing 10 except the detection cover 11 and the sliding lid 12 to maintain aesthetic appearance of the wall, prevent dust from penetrating into the recess, and prevent users from accidentally touching power wires or cable in the recess of the wall. After the protection cover 71 is mounted on the wall, the sliding lid 12 is not slidable any more in consideration of prevention of setting change due to accidental touch after the setting is done.

In sum, as having both a passive infrared detector 40 and an active microwave sensing module 50 and the microwave sensing module 50 is operable in a frequency range of 5.0 GHz~26.0 GHz, the wallmount dual beam sensing device in accordance with the present invention can statically and dynamically sense a monitored environment in a 3D manner at the same time. Moreover, the wallmount dual beam sensing device can be buried in a wall to make the present invention more aesthetically appealing than conventional exposed sensing device on the ceiling. Additionally, the present invention is mounted in a wall without having any hole exposed outside, thereby preventing dust from entering the sensing device and securing a high sensing reliability.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A wallmount dual beam sensing device, comprising:
a housing having a detection cover mounted on a front surface of the housing;
a control module mounted inside the housing and having a microcontroller unit (MCU), wherein the MCU has an ambient light terminal, an infrared terminal and a microwave terminal;
an infrared detector mounted inside the housing, covered by the detection cover, electrically connected to the infrared terminal of the MCU, and detecting human presence;
a microwave sensing module mounted inside the housing and electrically connected to the microwave terminal of the MCU; and
an ambient light detector mounted inside the housing, covered by the detection cover, and electrically connected to the ambient light terminal of the MCU to detect luminance of a monitored environment;
wherein
the infrared detector and the ambient light detector are constantly operating after powered on;
when the detected luminance of the monitored environment is lower than a luminance threshold, the MCU determines if the infrared detector detects human presence, when the infrared detector detects human presence, the MCU activates the microwave sensing module to determine if the microwave sensing module detects human presence, and when the microwave sensing module detects human presence, the MCU sends out a control signal adapted to turn on at least one electric appliance; and
when the at least one electric appliance is turned on and the detected luminance is equal to or higher than the luminance threshold, the MCU further determines if the human presence is detected by the infrared detector and the microwave sensing module, when both the infrared detector and the microwave sensing module detect no human presence, the MCU then outputs a control signal to turn off the at least one electric appliance.

2. The wallmount dual beam sensing device as claimed in claim 1, wherein the microwave sensing module has a microwave detector and a filter amplifier electrically connected to the microwave detector and the microwave terminal of the MCU.

3. wallmount dual beam sensing device as claimed in claim 2, wherein the control module further has multiple configuration units electrically connected to the MCU.

4. The wallmount dual beam sensing device as claimed in claim 3, wherein each of a portion of the multiple configuration units is a variable resistor electrically connected to a mains resistor adjacent to a power source and a voltage setting port of the MCU.

5. The wallmount dual beam sensing device as claimed in claim 4, wherein the housing further has:
   multiple slots;
   a fixing frame taking a form of a thin metal frame securely mounted on the front surface of the housing with the detection cover and the sliding lid exposed; and
   a protection cover stacked on the fixing frame and having multiple inserts respectively engaging the slots.

6. The wallmount dual beam sensing device as claimed in claim 3, wherein each of a portion of the multiple configuration units is a switching unit, the switching unit has:
   a mains resistor adjacent to a power source;
   multiple switches; and
   multiple resistors connected in parallel to each other with each resistor connected in series to the mains resistor through one of the multiple switches;
   wherein a common series-connected node between the mains resistor and each switch is connected to the MCU.

7. The wallmount dual beam sensing device as claimed in claim 6, wherein the housing further has a sliding lid slidably mounted on a portion of the front surface of the housing other than the detection cover, and the sliding lid has at least one test switch electrically connected to the MCU.

8. The wallmount dual beam sensing device as claimed in claim 7, wherein the control module further has an indicator mounted inside the detection cover and electrically connected to the MCU.

9. The wallmount dual beam sensing device as claimed in claim 8, wherein the microwave sensing module is operable in a frequency range of 5.0 GHz to 26.0 GHz.

10. The wallmount dual beam sensing device as claimed in claim 9, wherein the housing further has:
    multiple slots;
    a fixing frame taking a form of a thin metal frame securely mounted on the front surface of the housing with the detection cover and the sliding lid exposed; and
    a protection cover stacked on the fixing frame and having multiple inserts respectively engaging the slots.

11. The wallmount dual beam sensing device as claimed in claim 3, wherein the housing further has:
    multiple slots;
    a fixing frame taking a form of a thin metal frame securely mounted on the front surface of the housing with the detection cover and the sliding lid exposed; and
    a protection cover stacked on the fixing frame and having multiple inserts respectively engaging the slots.

12. The wallmount dual beam sensing device as claimed in claim 6, wherein the housing further has:
    multiple slots;
    a fixing frame taking a form of a thin metal frame securely mounted on the front surface of the housing with the detection cover and the sliding lid exposed; and
    a protection cover stacked on the fixing frame and having multiple inserts respectively engaging the slots.

13. The wallmount dual beam sensing device as claimed in claim 7, wherein the housing further has:
    multiple slots;
    a fixing frame taking a form of a thin metal frame securely mounted on the front surface of the housing with the detection cover and the sliding lid exposed; and
    a protection cover stacked on the fixing frame and having multiple inserts respectively engaging the slots.

14. The wallmount dual beam sensing device as claimed in claim 8, wherein the housing further has:
    multiple slots;
    a fixing frame taking a form of a thin metal frame securely mounted on the front surface of the housing with the detection cover and the sliding lid exposed; and
    a protection cover stacked on the fixing frame and having multiple inserts respectively engaging the slots.

15. The wallmount dual beam sensing device as claimed in claim 2, wherein the housing further has:
    multiple slots;
    a fixing frame taking a form of a thin metal frame securely mounted on the front surface of the housing with the detection cover and the sliding lid exposed; and
    a protection cover stacked on the fixing frame and having multiple inserts respectively engaging the slots.

16. The wallmount dual beam sensing device as claimed in claim 1, wherein the housing further has:
    multiple slots;
    a fixing frame taking a form of a thin metal frame securely mounted on the front surface of the housing with the detection cover and the sliding lid exposed; and
    a protection cover stacked on the fixing frame and having multiple inserts respectively engaging the slots.

* * * * *